United States Patent [19]

Maubois et al.

[11] 3,914,435

[45] Oct. 21, 1975

[54] MANUFACTURE OF CHEESE FROM ULTRAFILTERED MILK

[75] Inventors: Jean-Louis Joseph Maubois, Rennes; Germain Pierre Charles Gabriel Mocquot, Versailes; Louis Jean Vassal, Jouy En Josas, all of France

[73] Assignee: Institut National de la Recherche Agronomique, Paris, France

[22] Filed: Jan. 5, 1973

[21] Appl. No.: 321,125

Related U.S. Application Data

[63] Continuation-in-part of Ser. No. 299,837, Oct. 24, 1972, which is a continuation-in-part of Ser. No. 53,002, July 7, 1970, abandoned.

[30] Foreign Application Priority Data

July 18, 1969 France............................... 69.24555
Jan. 7, 1972 France............................... 72.00507

[52] U.S. Cl..................... 426/40; 426/36; 426/491; 426/522
[51] Int. Cl............................................. A23c 19/02
[58] Field of Search.......... 99/54, 116, 55; 299/837; 426/361, 491, 490, 36, 40, 522

[56] References Cited
UNITED STATES PATENTS

| 1,511,808 | 10/1924 | Grindrod | 99/55 |
| 1,711,032 | 4/1929 | Richardson | 99/116 |
| 2,681,858 | 6/1954 | Stimpson | 99/55 |
| 3,316,098 | 4/1967 | Noznick et al. | 99/116 |

FOREIGN PATENTS OR APPLICATIONS 2,052,121   9/1971   France

OTHER PUBLICATIONS

Hutin; J., La Fromagerie de l'An 2000, La Technique Laitere, No. 3, 1960 (pp. 13–17).

Kosikowski; F., Cheese and Fermented Milk Food, published by the author, Cornell University, N.Y., 1966, (pp. 400–406).

Michaels, A. S., Ultrafiltration, Amicon Corporation, Lexington, Mass., Booklet 410, 905, 1968 (pp. 12–27).

Michaels, A. S., New Separation Technique for the CPI, Chemical Engineering Progress, Vol. 64, No. 12, 1968 (pp. 31–43).

Primary Examiner—David M. Naff
Attorney, Agent, or Firm—Oblon, Fisher, Spivak, McClelland & Maier

[57] ABSTRACT

Cheese is made from heat treated milk and without the conventional draining of whey by a process which involves ultrafiltering milk to produce a milk concentrate having essentially the composition of cheese produced by conventional whey draining processes, sterilizing by heating the milk before or after ultrafiltration, adding rennet to the concentrate to cause coagulation and to produce cheese curd, and converting the curd into cheese. This process enables the milk before or after ultrafiltration to be heated at temperatures of 110° to 150°C without making the milk more difficult to coagulate with rennet as normally occurs when milk is heated to high temperatures.

8 Claims, No Drawings

MANUFACTURE OF CHEESE FROM ULTRAFILTERED MILK

RELATED APPLICATIONS

This application is a continuation-in-part of our copending application Ser. No. 299,837 filed Oct. 24, 1972, which in turn, was copending with and a continuation-in-part of our application Ser. No. 53,002, filed July 7, 1970.

FIELD OF THE INVENTION

This invention relates to liquid product called a drained cheesemilk, which has substantially the ingredient content and the ingredient concentration suitable for making cheese customarily found only in milk curds, in which the whey drainage process is going on.

BACKGROUND OF THE INVENTION

In the copending applications set out above and the corresponding French patent applications, we have disclosed in greater detail the process by which the drained cheesemilk is obtained.

More particularly, these applications disclose a method making it possible to obtain from milk, on the one hand, a liquid filtrate containing the major portion of the soluble constituents of the initial milk, such as lactose, mineral salts, non-protein nitrogen substances and, on the other hand, a liquid retentate (tenate) containing all the casein of the initial milk, the greater portion of the soluble proteins and a small portion of the soluble components, at concentrations substantially equal to those found in cheese prepared from milk at the end of the whey draining process. Thus, one object of those inventions is a process for preparing from milk, as supplied by the milch animal, a liquid raw material having the concentration and composition of drained cheese.

The essential characteristic of the invention described in the previous applications is therefore a method for the treatment of milk by ultrafiltration, in order to obtain a product having substantially the same composition as a cheese, but in a liquid form, the said product then being converted into cheese.

These applications disclose that the methods enables one to process all types of milk previously used for the manufacture of cheese. It is possible, for example, to use cow's, goat's or ewe's milk as the starting liquid, which may be subjected in a known manner to moderate heating prior to treatment.

In summary, the process described in our previous applications consists in contacting milk with at least one semipermeable membrane, the average pore diameter of which is at most equal to 30m$\mu$, at a pressure of from 1 to 50 kg/sq.cm., which provides a first liquid, or filtration liquid (filtrate), which passes through the said membrane and which is collected, and a second liquid, or retentate, which does not pass through the said membrane and which has an enrichment, notably in proteins, higher than that of the starting product.

The dairy product which does not pass through the membrane, or retentate, becomes progressively richer in proteins as the process is continued.

Thus, the process may be repeated, or continued until a liquid retentate is obtained which does not pass through the membrane and has a concentration, notably in proteins, substantially equal to that of the cheese type food product desired.

DESCRIPTION OF THE INVENTION

The present invention is a development of the process of the main patent as regards the nature of the dairy product used as a starting material for cheese making or the retentate used to make the cheese.

Fundamentally, the invention relates to the use of a dairy product having undergone heat treatment at a temperature higher than about 100°C., and advantageously higher than 110°C., the said heat treatment being applicable to the milk itself prior to ultrafiltration or to the retentate obtained after ultrafiltration of milk which has not been subjected to heat treatment.

The surprising nature of the results obtained with the method of this invention should therefore be emphasized.

It is indeed known that milk, and especially cow's milk, is more difficult to coagulate with rennet when heated above a certain temperature. This is the case with milk boiled at about 100°C. It is the same thing with milk which had been heated to autoclave sterilization temperatures (110° to 115°C. for 10 to 20 min.), as well as milk which has undergone known ultra-high temperature (U.H.T.) heating, during which the milk is heated to a temperature in the range of 110°C to 150°C, according to the heating intensity desired, and maintained at said temperature for 2 to 8 seconds, usually about 4 to 10 seconds, and then cooled.

When, after having been subjected to such known heating, milk was brought to 30°C and rennet was added, it was observed in the prior technique that either coagulation did not occur, or a very soft coagulum was formed slowly, which did not harden, did not exude whey by syneresis, did not drain, or drained very badly. Such a coagulum is therefore not very suitable, or is even totally unsuitable for conversion into cheese. This invention shows, on the other hand, that when milk, having been subjected to one of the aforesaid known types of heating, and notably to U.H.T. heating between 110°C and 150°C, for 2 to 8 seconds is then subjected to ultrafiltration until its protein concentration is twice that of the protein concentration of the starting milk, has its temperature adjusted to 30°C and the rennet added thereto, a consistent, firm coagulum is observed to form, which is suitable under the convention operations for converting milk into cheese.

Instead of starting with a heat-treated milk, such as a U.H.T. milk, it is possible, according to this invention, to heat the "retentate" obtained from raw or pasteurized milk according to the method described in our earlier applications, to a temperature higher than 110°C and then use the said "retentate" for the manufacture of cheese. The consistency and firmness of the coagulum obtained after the action of rennet on the said "retentate" subjected to such a heat treatment were found to be substantially the same as those of the coagulum obtained by the action of rennet on a "retentate" obtained from milk subjected to heat treatment at a temperature higher than 110°C.

Thus, according to this invention, either the milk or a by-product from milk, particularly skimmilk, prior to ultrafiltration or the "retentate" obtained after ultrafiltration, or both, can be subjected to heat treatment at a temperature higher than 110°C.

The liquid retentate can, moreover, be deemed to be a protein-enriched "milk" or a liquid drained cheesemilk.

The retentate hereof has a capacity to coagulate in response to rennet higher than that possessed by milk produced by the milch-animal, and notably the cow. Said property of the retentate was revealed experimentally, as will be seen from the following description.

A certain desired weight of raw milk is used as a starting product and said milk is subjected to ultrafiltration under the conditions described in greater detail in our earlier applications. An aliquot fraction of the "retentate" is taken at regular intervals of time. As ultrafiltration continues, a series of samples with increasing protein concentrations is thus obtained; the first sample, corresponding to the first aliquot fraction of the "retentate" has, for instance, a protein concentation equal to 1.5 times that of the starting milk, the second to twice, the third to three times the protein concentration of the starting milk, etc. The last sample taken at the end of ultrafiltration has, for example, a protein content 6 times that of the starting milk.

If the same amount of rennet (for example, 0,01 ml of commercial liquid rennet, of a strength of 10,000) is added to a predetermined weight (20 g for exampel) of each of the sampels of "retentate" having a temperature of 30°C., the duration of coagulation is observed to be substantially the same, whatever the protein content of the various samples of "retentate" examined. In other words, when the protein content of the "retentate" is, for instance, six times that of the starting milk (milk as it is obtained from the cow), the amount of rennet — based on 1 gram of protein present in the sample of "retentate" in question — necessary to add to obtain coagulation by a time $t$, is one-sixth — also based on 1 gram of protein present — that required to coagulate the starting milk in the same time $t$.

According to the invention, the ultrafiltration of milk having undergone heat treatment, such as U.H.T. milk, or the heat treatment, for example U.H.T. heating of the retentate or previously ultrafiltrated milk, has many advantages.

Firstly, in all cases a starting material is obtained which is perfectly suited for the manufacture of cheese as it is well coagulated by rennet under normal conditions.

Secondly, it is thus possible to have a starting material from which all undesirable microorganisms, such as fermentation microorganisms which have a detrimental effect on cheese, have been eliminated. The invention thus makes use of the preliminary sterilization of the milk (or the protein-enriched milk which constitutes the retentate). The invention notably provides a starting material in which the spore forming bacteria belonging to the genus Clostridium are destroyed. Now, it has long been known that bacteria of the genus Clostridium are responsible for the butyric fermentation ("late" fermentation) of cooked cheese, notably Gruyere cheese.

A moderate (110°C) U.H.T. treatment of milk, associated with ultrafiltration, makes it possible to obtain a milk which coagulates well, and is therefore suitable for making cooked cheeses, but without the risk of their undergoing butyric fermentation. This opens up new prospects for milk producing regions where cooked cheese is made, notably Gruyere, as these regions can thus envisage feeding silage to cows, which is much easier to use than normal fodder (hay) whereas feeding silage to the cows in said Gruyere making areas is presently forbidden owing to the well known risk arising from Clostridia which are often present in large numbers in silage.

The invention therefore has positive economical advantages, especially when applied to the manufacture of Gruyere cheeses (Gruyere, Comte, Emmental and the like).

Various types of membranes were used to prepare the "retentate." Membranes available on the market were made either from polyolefins (as in the case for membranes sold under the trade name "Diaflo" by the firm Amicon, U.S.A.), or from polyacrylonitrile or polyvinylchloride (as is the case for membranes sold by the firm Rhone-Poulenc, France), or from cellulose acetate (as in the case for membranes sold by the firms De Danske Sukkerfabriker, Denmark and Abcor, U.S.A.).

The following purely illustrative examples will further facilitate an understanding of the invention.

EXAMPLE 1

The manufacture of a soft cheese (Camembert type) is described in this example.

Using filtration techniques set out in greater detail in our earlier applications, 10 kgs of milk (32 g/kg fat content) having undergone ultra high temperature treatment (150°C for 2 seconds), circulated across a membrane available on the market under the same "Diaflo PM 30" contained in an "Amicon TC. 1" ultrafiltration apparatus. The temperature of the milk was 10°C.

When the weight of the filtrate recovered reached 5.456g, the "retentate" was collected. It had the following composition:

| | |
|---|---|
| Nitrogen substances | 6.5 g percent |
| Total dry extract | 18.5 g percent |
| Fat content | 6.6 g percent |
| Ash | 0.8 g percent |
| Ph | 6.7 |

3kg of said "retentate" was heated to 30°C and 1.6g of a suspension of frozen, concentrated starter (*Streptococcus lactis*) was added. The mixture was maintained at this temperature. When the pH reached a value of approximately 6.2, 0.4 ml of a commercial rennet solution per kg of "retentate" was added. "Setting" (formation fo coagulum) occurred 7 minutes after the addition of the rennet.

The coagulum, which was soft at the start, became firm in about 15 minutes.

One hour after the addition of rennet, the cheese was moulded according to the technique normally used in the manufacture of Camembert. The last part of the coagulum drainging process occurred under conditions comparable to normal conditions. Sixteen hours after the addition of rennet, the cheeses were removed from the moulds and salted according to the conventional technique. Camembert type cheese possessing satisfactory organoleptic properties were thus obtained.

EXAMPLE 2

12.1 kg of 37 "retentate" obtained according to the process described in our previous applications was carefully with a 3.9 kg of fresh cream. Aliquot portions of this mixture, or drained cheesemilk weighing 350 g were placed in flasks and put to sterilize in an autoclave at 115° for 15 minutes.

After cooling to 30°C, the drained cheesemilk had added to it a few mg of *Penicillum caseicolum* spores, a sufficient amount of lactic acid to bring the pH to 5.7 and rennet, at a strength of 1/10,000 (0.02% of the weight of the drained cheesemilk). Moulding was carried out after careful stirring. Coagulation (or "setting") of the drained cheesemilk occurred in less than 1 minute. One hour after setting, the cheese were removed from the moulds, placed on slats in a drainage cylinder. They were turned over, salted and ripened under the normal conditions used in the technique of soft cheese manufacture.

We claim:

1. A process for making cheese from milk consisting essentially of the steps of separating said milk by ultra filtration into a first liquid filtrate component and a second retained liquid retentate component by contacting said milk with a semipermeable membrane, the average pore diameter of which is at most equal to 30 m$\mu$, at a pressure of from 1 to 50 kg/cm$^2$, said first liquid filtrate component passing through and said semi-permeable membrane and said second liquid retentate component not passing through said semi-permeable membrane and having a higher concentration of proteins than said first liquid component, the pore diameter of said semi-permeable membrane and said pressure being selected so that the lactose and minerals salts in the aqueous phase of the milk pass through the semi-permeable membrane in substantially the proportions they appear in said aqueous phase and so that substantially no proteins pass through the semi-permeable membrane, maintaining said second liquid retentate under agitated conditions adjacent said membrane and continuing contacting said second liquid retentate component with a semi-permeable membrane as defined above under the foregoing pressure and agitation conditions until a liquid milk retentate is obtained suitable for conversion into a cheese of a desired type in the conventional manner having a concentration of proteins substantially equal to at least about 1.5 times that of the starting milk and having a composition of proteins and soluble components including lactose and mineral salts which is substantially equal to those found in cheese prepared from milk at the end of ordinary whey draining processes, heating either said milk prior to ultrafiltration or said liquid retentate at a temperature of from 110° – 150°C for a period of time sufficient to sterilize said milk or retentate, adding rennet to said liquid retentate to coagulate said retentate and thereby produce cheese cured from said retentate, and thereafter converting said cheese curd into cheese.

2. The process of claim 1 in which the milk is heated before being subjected to ultrafiltration.

3. The process of claim 1 in which the retentate is heated after at least part of the ultrafiltration has taken place.

4. The process of claim 1 in which the retentate is converted into a Gruyere type cheese.

5. The process of claim 1 in which the retentate is converted into a soft cheese.

6. The process of claim 1, wherein heating is effective for a period of 2–8 seconds.

7. The process of claim 1, wherein heating is effective for a period of from 10 – 20 minutes.

8. The process of claim 1 wherein said milk is skimmilk.

* * * * *